(12) United States Patent
Shead et al.

(10) Patent No.: US 11,242,787 B2
(45) Date of Patent: Feb. 8, 2022

(54) METHOD AND APPARATUS FOR SELECTIVE CATALYTIC REDUCTION SYSTEM

(71) Applicant: Perkins Engines Company LTD, Peterborough (GB)

(72) Inventors: Leo Shead, Stamford (GB); Alexis Eden, Thrapston (GB); Ronald Silver, Peoria, IL (US); Thomas Steffen, Loughborough (GB)

(73) Assignee: Perkins Engines Company Limited, Peterborough (GB)

( * ) Notice: Subject to any disclaimer, the term of this patent is extended or adjusted under 35 U.S.C. 154(b) by 293 days.

(21) Appl. No.: 16/463,963

(22) PCT Filed: Dec. 11, 2017

(86) PCT No.: PCT/EP2017/082183
§ 371 (c)(1),
(2) Date: May 24, 2019

(87) PCT Pub. No.: WO2018/114421
PCT Pub. Date: Jun. 28, 2018

(65) Prior Publication Data
US 2020/0386136 A1 Dec. 10, 2020

(30) Foreign Application Priority Data
Dec. 21, 2016 (EP) ..................... 16205952

(51) Int. Cl.
*F01N 3/20* (2006.01)
*B01D 53/94* (2006.01)

(52) U.S. Cl.
CPC ......... *F01N 3/208* (2013.01); *B01D 53/9431* (2013.01); *B01D 53/9495* (2013.01);
(Continued)

(58) Field of Classification Search
CPC combination set(s) only.
See application file for complete search history.

(56) References Cited

U.S. PATENT DOCUMENTS 7,028,465 B2 * 4/2006 Ripper ............... F01N 3/208
60/286
8,899,024 B2 * 12/2014 Masaki ............... F01N 3/106
60/286

(Continued)

FOREIGN PATENT DOCUMENTS

CN 1187778 A 7/1998
CN 1353006 A 6/2002
(Continued)

OTHER PUBLICATIONS

Chinese Office Action Application No. 201780077536.5; reported on Sep. 25, 2020.
(Continued)

*Primary Examiner* — Binh Q Tran

(57) ABSTRACT

Selective catalytic reduction systems are known and are generally included in exhaust systems of diesel engines in order to treat the exhaust gases of such engines. Such systems involve the introduction of diesel exhaust fluid (DEF) into exhaust gas flowing in an exhaust passage of an engine. When dosing DEF onto a hydrolysis catalyst in a SCR system, the DEF will under certain conditions cool the hydrolysis catalyst sufficiently to either slow down or effectively prevent ammonia release, which creates a lag or delay in the function of the hydrolysis catalyst. This limits the amount of control which can be exerted over ammonia storage in the SCR catalyst, and NOx conversion. In a first step, a set of measurement data is received from one or more sensors provided in the system. Subsequently, a first set of characteristics associated with a state of a component of the catalytic system, a second set of characteristics associated
(Continued)

with an output of the catalytic system and a third set of characteristics associated with a bias and a scaling factor in the system are derived. In a third step, the derived sets of characteristics are used to control the catalytic system.

18 Claims, 3 Drawing Sheets

(52) U.S. Cl.
CPC .. *F01N 2610/02* (2013.01); *F01N 2900/0404* (2013.01); *F01N 2900/1602* (2013.01); *F01N 2900/1628* (2013.01); *F01N 2900/1811* (2013.01); *F01N 2900/1812* (2013.01); *F01N 2900/1818* (2013.01)

(56) References Cited

U.S. PATENT DOCUMENTS

| | | | | |
|---|---|---|---|---|
| 10,227,940 | B2* | 3/2019 | Yasui | F02D 41/005 |
| 10,934,917 | B2* | 3/2021 | Clayton | F01N 3/208 |
| 2009/0151339 | A1 | 6/2009 | Doring | |
| 2010/0024393 | A1* | 2/2010 | Chi | F01N 3/106 60/276 |
| 2013/0167512 | A1* | 7/2013 | Brueck | F01N 3/208 60/282 |
| 2016/0290272 | A1* | 10/2016 | Lee | F02D 41/1454 |
| 2017/0037799 | A1* | 2/2017 | Balenovic | F01N 3/2066 |

FOREIGN PATENT DOCUMENTS

| | | |
|---|---|---|
| CN | 101462023 A | 6/2009 |
| CN | 101683589 A | 3/2010 |
| CN | 102580761 A | 7/2012 |
| CN | 102686842 A | 9/2012 |
| CN | 102926847 A | 2/2013 |
| CN | 104847460 A | 8/2015 |
| CN | 105308282 A | 2/2016 |
| DE | 102007006625 A1 | 8/2008 |
| EP | 0555746 A1 | 8/1993 |
| EP | 0907010 A2 | 4/1994 |
| EP | 0939206 A2 | 9/1999 |
| EP | 1338770 A2 | 8/2003 |
| EP | 2075050 A2 | 7/2009 |
| EP | 2339136 A1 | 6/2011 |
| JP | 2006009608 A | 1/2006 |
| JP | 2013213466 | 10/2013 |
| JP | 2016121678 | 7/2016 |

OTHER PUBLICATIONS

International Search Report for Application No. PCT/EP2017/082183; reported on Mar. 14, 2018.

* cited by examiner

METHOD AND APPARATUS FOR SELECTIVE CATALYTIC REDUCTION SYSTEM

CROSS-REFERENCE TO RELATED APPLICATION

This Application is a 35 USC § 371 US National Stage filing of International Application No. PCT/EP2017/082183 filed on Dec. 11, 2017 which claims priority under the Paris Convention to European Patent Application No. 16205952.1 filed Dec. 21, 2016.

FIELD

The present invention relates to selective catalytic reduction (SCR) systems for treating exhaust gasses. In particular, the present invention relates to methods improving efficiency of SCR systems.

BACKGROUND

Selective catalytic reduction (SCR) systems are known and are generally included in the exhaust systems of diesel engines in order to treat the exhaust gases of such engines. Such systems involve the introduction of diesel exhaust fluid (DEF) into exhaust gas flowing in an exhaust passage of an engine. The DEF contains urea which undergoes a hydrolysis and/or thermolysis within the exhaust passage whereby ammonia is produced. The ammonia passes into a SCR catalyst where it reacts with the exhaust gas, wherein any nitrogen oxides (NOx) present in the exhaust gas are converted to nitrogen and water before passing out of the exhaust into the atmosphere.

A number of SCR systems which dose DEF into the exhaust passage have been proposed, Such systems are sometimes referred to as "wet spray" systems and inject a spray of aqueous urea into the exhaust gas where it decomposes to form ammonia. An example of such a system is shown in US2008307967A1, US'967 discloses an arrangement in which DEF is hydrolysed in a supply passage which is outside of a main exhaust passage. Specifically, DEF is dosed onto a hydrolysis catalyst and hydrolysed to ammonia. The ammonia flows downstream to an inlet of a SCR catalyst where it acts to reduce NOx. Generally, a known control process followed by a SCR system such as the one disclosed in US'967 involves dosing the hydrolysis reactor with DEF when ammonia is required to reduce NOx.

US 2013/0186086 discloses an catalytic system that contains a hydrolysis catalyst located downstream of an injecting means injecting urea solution into the system, and a controller that controls the amount of urea solution injected into the system. A temperature sensor detects the temperature of exhaust gasses near the location of the urea injecting means. On the basis of the temperature information, the control unit decides whether the exhaust gases are at a high enough temperature to vaporise the amount of urea solution.

When dosing DEF onto a hydrolysis catalyst in a SCR system, the DEF will under certain conditions cool the hydrolysis catalyst sufficiently to either slow down or effectively prevent thermolysis of urea and subsequent hydrolysis of isocyanic acid, and desorption of ammonia and the isocyanic acid. This suppression of ammonia release creates a lag or delay in the function of the hydrolysis catalyst. This limits the amount of control which can be exerted over ammonia storage in the SCR catalyst, and NOx conversion. Furthermore, the slowed or prevented thermolysis of urea can also lead to urea deposits forming in the exhaust passage, and unreacted urea or ammonia passing untreated out of the exhaust passage in an ammonia slip event if, for example, an exhaust inlet temperature rise occurs.

Optimised dosing strategies may be employed that address the problems described above. However, to successfully employ such strategies requires information regarding the internal states of the hydrolysis catalyst, e.g. internal temperature and NH3-equivalent storage profiles. Embedded models, such as are typically used on known systems, may not determine the internal temperature profile accurately enough to provide the information required for such optimised control strategies.

It is an object of the present disclosure to at least address some of the above problems.

SUMMARY OF INVENTION

In a first aspect, there is provided a method for a selective catalytic reduction system, the selective catalytic reduction system comprising a hydrolysis catalyst, the method comprising:
  receiving at least one set of measurement data;
  deriving a first, a second and a third set of characteristics of the system based on the at least one set of measurement data, wherein
  the first set of characteristics is associated with a state of a component of the catalytic system, and
  the second set of characteristics is associated with an output of the system;
  the third set of characteristics is associated with an input state or output bias of the system; and
  using the derived first, second and third sets of characteristics to control the catalytic system.

According to a second aspect, there is provided a selective catalytic reduction system for treating exhaust gas in an exhaust passage, the system comprising:
  a hydrolysis catalyst;
  a DEF dosing unit configured to inject DEF onto the hydrolysis catalyst;
  a controller configured to carry out the method of any of claims 1 to 5; and
  at least one sensor in communication with the controller.

According to a third aspect, there is provided a computer program product containing one or more sequences of machine-readable instructions for performing a method as set out above.

According to a fourth aspect, there is provided an exhaust apparatus for a vehicle, the apparatus comprising a selective catalytic reduction system as set out above.

According to a fifth aspect, there is provided a vehicle comprising a selective catalytic reduction system as set out above.

Further aspects, features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Before describing specific embodiments of the invention in detail, it is instructive to present an example environment in which embodiments of the present invention may be implemented.

Figure 1:
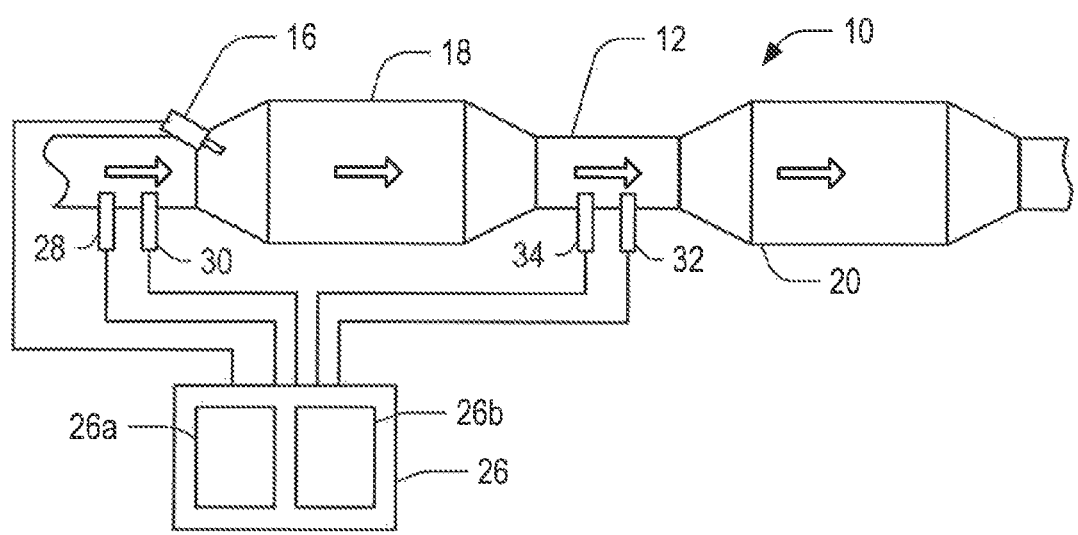
FIG. 1 shows a selective catalytic reduction system.

FIG. 1 shows an exemplary selective catalytic reduction (SCR) system 10. The system is located in an exhaust, passage 12 that conveys exhaust, gas away from an engine of a vehicle (not shown). Initially, the exhaust gas passes through a diesel oxidation catalyst (DOC, not shown) of a known type, which catalyses an oxidation reaction of hydrocarbons, carbon monoxide and nitric oxide in the exhaust gas to produce carbon dioxide and water.

Downstream of the DOC is located a diesel exhaust fluid (DEF) dosing unit 16 that is configured to inject DEF onto a hydrolysis catalyst 18. Both the DEF dosing unit and the hydrolysis catalyst are of known types. Located downstream of the hydrolysis catalyst is a SCR catalyst 20 of a known type. It will be appreciated that the system 10 may comprise additional components, such as an ammonia slip catalyst.

The system includes a controller 26 that is in communication with the DEF dosing unit, and is configured to control a rate at which the DEF dosing unit injects DEF onto the hydrolysis catalyst.

The system additionally includes a plurality of sensors in communication with the controller. Specifically, upstream of the hydrolysis catalyst is located a Nitrogen Oxide (NOx) sensor 28 and an inlet temperature sensor 30. Located between the hydrolysis catalyst and the SCR catalyst is an outlet temperature sensor 32 and an ammonia sensor 34. It will be appreciated that the above-described sensors are exemplary only, and that additional or alternative sensors may be comprised in the system. Each of the various sensor may be connected to one or more inputs and/or outputs provided on the controller. During operation, the controller regulates the DEF dosage rate based, in part, on the measurement data received from the various sensors of the system.

It should be noted that, while the catalytic system is shown as having only a single controller 26, it is in principle equally possible to utilise a plurality of interconnected controllers. Alternatively, the controller may comprise a plurality of individual sub-controllers 26a, 26b. Each of the sub-controllers may perform specific operations, e.g. the first sub-controller 26a may perform operations relating to the performance of the SCR catalyst 20 and the second sub-controller 26b may perform operations relating to the performance of the hydrolysis catalyst 18.

Figure 2:
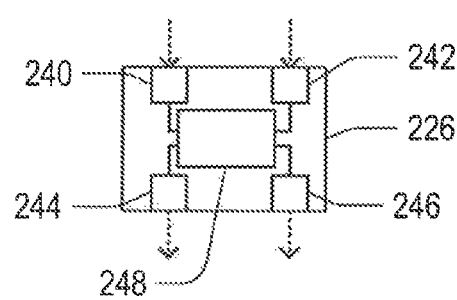
FIG. 2 depicts an exemplary controller.

An exemplary controller, such as may be used in FIG. 1, will now be described with reference to FIG. 2. The controller 226 comprises a first input 240, to which the upstream sensors are connected, and a second input 242, to which the downstream sensors are connected. It will be appreciated that the first and second inputs are purely for exemplary purposes, and that the controller may comprise any suitable number and types of inputs in order to receive measurement data from the sensors. The controller comprises a first output 244 and a second output 246, the function of which will be discussed in more detail below. The controller further comprises a processing unit 248 for determining the DEF dosage rate based on the received measurement data. The determinations may be performed in any suitable fashion, using one or more algorithms or modelling components implemented in the processing unit.

Figure 3:
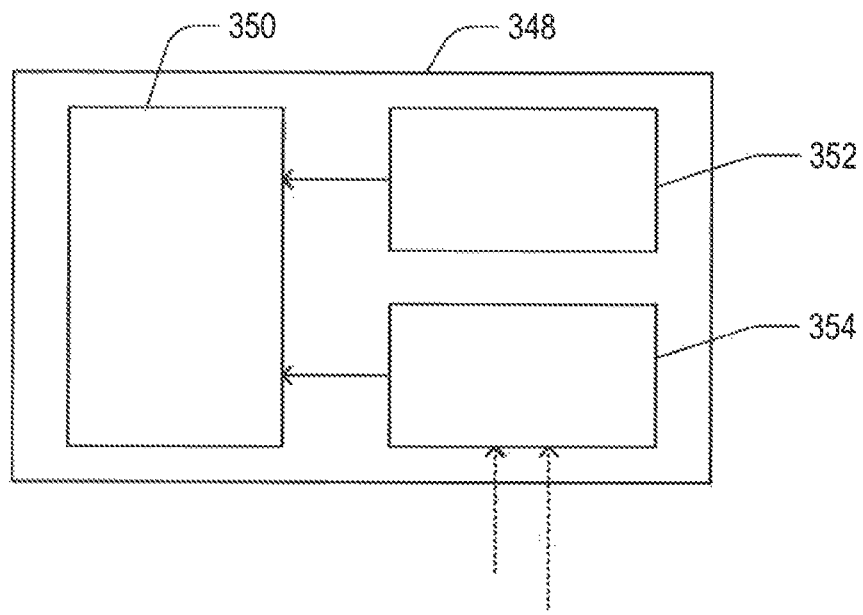
FIG. 3 illustrates an exemplary processing unit for a controller.

An exemplary implementation of modelling components in a processing unit such as the one shown in FIG. 2 will now be described with reference to FIG. 3. It will be appreciated that this exemplary only, and that additional and/or alternative modelling components may be implemented in the processing unit.

In the processing unit 348 is implemented, an estimator component 350. The estimator component is used to carry out one or more calculations, and may be implemented in any suitable fashion, as will be described in more detail in the following. In addition to the estimator, one or more models representing the behaviour of one or more components of the catalytic system may be implemented. In the present example, a hydrolysis catalyst model component 352 and a sensor model component 354 is implemented in addition to the estimator component. Each of the implemented model components is used to model the behaviour of the corresponding physical component of the catalytic system, and to provide input to the estimator component during operation. In some examples, the model components may receive input from the estimator component during operation to further improve the accuracy of the calculations.

The hydrolysis catalyst model component may be implemented in any suitable fashion and may use any suitable number of parameters as input. In an example, the hydrolysis catalyst model takes as input measured/calculated signals related both to the exhaust gas conditions upstream of the catalyst and to the DEF injection quantity that, without limitation, are representative of; an estimated input concentration of HNCO; an estimated input concentration of $NH_3$; an estimated input concentration of DEF; an estimated input concentration of water ($H_2O$); or an estimated input temperature ($T_{in}$); that, without limitation, are used to predict both the estimated evolution of the system internal distributed-parameter states, including: internal temperature. Tint of the hydrolysis catalyst; levels of DEF; levels of ammonia ($NH_3$); levels of water ($H_2O$); levels of solid urea ($CO(NH_2)_2$) or levels of isocyanic acid (HNCO), and the output of the system, being, without limitation, data representative of: an estimated output level of HNCO; an estimated output level of $NH_3$; an estimated output level of DEF; an estimated output level of water ($H_2O$); or an estimated output temperature ($T_{out}$).

It will be appreciated that this implementation is exemplary only, and that other implementations may be envisaged. Examples include, but are not limited to; a neural network model (in which internal states do not correspond with physical states but are used for computational purposes only); a stochastic model (e.g. as used in a Kalman filter); or other linear or non-linear models.

The sensor model component is used to model the behaviour of at least one of the sensors of the system. In one example, the sensor model comprises plurality of individual sensor models, such as: a model of an upstream $NO_x$ sensor and model of a downstream $NO_x$ sensor. In another example, the sensor model additionally comprises a temperature sensor model that models at least one temperature sensor located in the system. In a specific example, the temperature sensor model comprises a model of an upstream temperature sensor and a downstream temperature sensor. By modelling the behaviour and characteristics of the one or more sensors used in the system, the accuracy of the estimator results may be improved.

The statistical accuracy of the sensor and model in various different operating conditions needs to be characterised and provided as parameters to the estimator algorithm.

In addition to the model components describe above, the sensor model may comprise additional model components. In some examples, the numerical sensor model comprises a decorrelator component. For example, a detector signal from a physical $NO_x$ sensor will comprise contributions from both $NO_x$ (e.g. NO and/or $NO_2$) as well as other gasses and compounds (e.g. $NH_3$). In order to determine the specific contribution from $NO_x$ it is necessary to determine the ratio between $NO_x$ and any other gasses or compounds (e.g. $NH_3$).

It will be appreciated that the above models are exemplary only and not intended to be limiting. The processing unit may comprise additional or alternative models. In an example, the processing unit comprises a DOC model that describes the behaviour of at least one parameter of a DOC catalyst.

INDUSTRIAL APPLICABILITY

Figure 4:
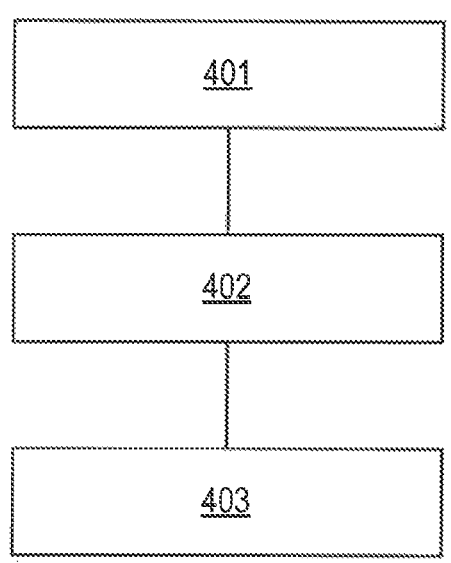
FIG. 4 shows an exemplary method in accordance with an embodiment of the invention.

An exemplary method will now be discussed with reference to FIG. 4. The exemplary method may be implemented in a suitable apparatus, for example the catalytic system shown in FIG. 1.

In a first step 401, at least one set of measurement data is received. The at least one set of measurement data is received from one or more sensors provided in the system. In some examples, measurement data is received from a plurality of sensors. In an example, a set of measurement data is received from each of the sensors of the system shown in FIG. 1.

The sets of measurement data may be obtained in any suitable fashion. In some examples, the measurement data is obtained during operation of the catalytic system. In specific examples, the measurement data may be obtained continuously or at fixed intervals. In some examples, the at least one set of measurement data may additionally comprise previously obtained measurement data. For example, measurement data recorded during previous operation sessions of the catalyst may be used. In yet other examples, the at least one set of measurement data may comprise additional historical or statistically derived data (e.g. obtained from other catalytic systems).

In a second step 402, a first set of characteristics associated with a state of a component of the catalytic system, a second set of characteristics associated with an output of the catalytic system and a third set of characteristics associated with a bias and a scaling factor in the system are derived.

The first set of characteristics may be associated with any component of the catalytic system. In some examples, the first set of characteristics are associated with at least one internal state of a hydrolysis catalyst of the catalytic system. In such examples, the first set of characteristics comprises a plurality of first parameters that each describes one of a plurality of internal parameters of the hydrolysis catalyst.

The parameter values may comprise, without limitation: a level of isocyanic acid (HNCO) stored in the hydrolysis catalyst; a level of ammonia ($NH_3$) stored in the hydrolysis catalyst; a level of DEF stored in the hydrolysis catalyst; a level of water ($H_2O$) stored in the hydrolysis catalyst; a level of solid urea ($CO(NH2)2$) stored in the hydrolysis catalyst; an internal temperature ($T_{int}$) of the hydrolysis catalyst; or a profile/distributed-parameter vector of at least one of said levels.

The second set of characteristics is associated with an output of any suitable portion of the catalytic system. In some examples, the second set of characteristics is associated with the overall output of the catalytic system. In other examples, the second set of characteristics is associated with an output of a component of the catalytic system, e.g, the hydrolysis catalyst.

The second set of characteristics may comprise data representative of any suitable number of output-related parameters. In one example, the second set of characteristics comprises, without limitation, data representative of: an estimated output level of HNCO; an estimated output level of $NH_3$; an estimated output level of DEF; an estimated output level of water ($H_2O$); or an estimated output temperature ($T_{out}$).

The third set of characteristics can be used to represent any unmodelled or unmeasured bias/scaling factor in either the inputs, states or outputs of the system arising from model uncertainty, sensor noise and/or disturbances acting on the system. These biases/scaling factors can be represented as additional representative states, or input/output disturbances acting on the system, and henceforth are assumed to be fully represented by the first or second characteristics, or extra features added to the system model.

In a third step 403, the derived first, second and third characteristics are used to control, the catalytic system. The first, second and third sets of characteristics are, in some examples, used in one or more controlling algorithms and/or controlling units to control the parameters of the catalytic system.

Figure 5:
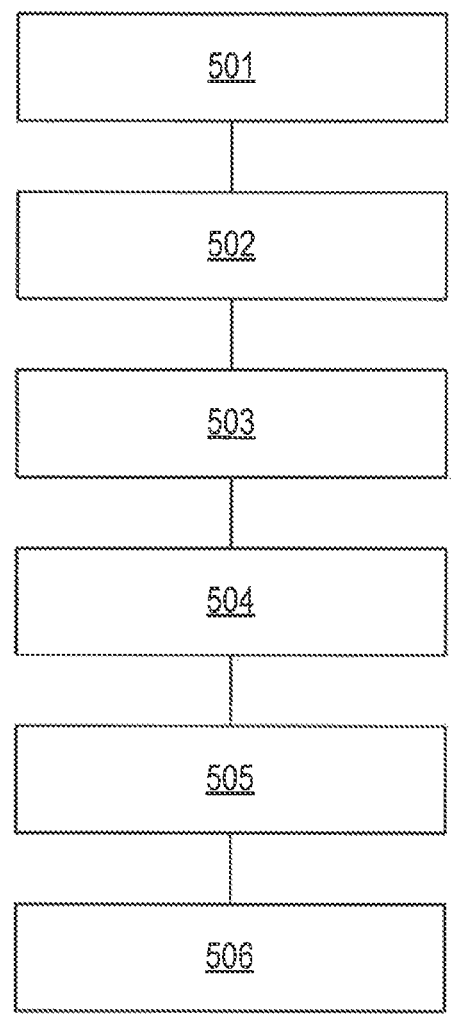
FIG. 5 illustrates a further exemplary method in accordance with an embodiment of the invention.

An exemplary methodology for performing the deriving step of the above method will now be described with reference to FIG. 5. It will be appreciated that the method described in the following is exemplary only, and that alternative methodologies may, in principle, equally well be used.

In a first step 501, a plurality of sigma points are generated. The sigma points are generated by using a so-called Unscented Kalman Filter (UKF) in a typical fashion, based on statistical knowledge of the model and sensor accuracies, and/or on at least one previous estimated system state.

In a second step 502, one or more evaluations of the model of the hydrolysis catalyst are performed. In the present example, an estimated output is derived for each of the generated plurality of sigma points. Further, for each of the generated plurality of sigma points, an projected internal step of the hydrolysis catalyst is derived.

In a third step 503, an average of the estimated outputs for each of the plurality of sigma points is derived. Further, an average of the projected internal state of the hydrolysis catalyst for each of the sigma points is derived.

In a fourth step 504, a plurality of covariances are calculated for the projected internal state and for the estimated output.

In a fifth step 505, an optimal observer gain is calculated for both the projected internal state and the estimated output.

In a sixth step 506, a resulting projected internal state for the hydrolysis catalyst and a corresponding covariance is derived based on at least one of: observer gain, measurements or projected internal states.

The sigma points and projected internal state may need to be constrained to within suitable levels at any/each of the above steps to maintain stability of the estimation algorithm.

Furthermore, improved estimator performance may be realised by estimating suitable functions of the states (e.g. logarithmic). The number of states/axial profile resolution chosen governs the computational burden of the algorithm, and so must be chosen carefully in order to maximise estimation accuracy whilst being practicable to implement.

The derived values may subsequently be used in a suitable fashion. In some examples, the derived values may be used as input for other numerical methods that are performed in the processing unit, e.g. as input for one or more of the model components. In other examples, the values may be stored in a memory and/or may be transmitted to a central processing unit for analysis.

It should be noted that the descriptions above are intended to be illustrative, not limiting. Thus, it will be apparent to one skilled in the art that modifications may be made to the invention as described without departing from the scope of the claims set out below.

The invention claimed is:

1. A method for a selective catalytic reduction system, the selective catalytic reduction system comprising a hydrolysis catalyst, the method comprising:
   receiving at least one set of measurement data;
   deriving a first, a second and a third set of characteristics of the system based on the at least one set of measurement data, wherein
   the first set of characteristics is a plurality of internal parameters of the hydrolysis catalyst including a level of a compound in the hydrolysis catalyst,
   the second set of characteristics is associated with an output of the system, and
   the third set of characteristics is associated with an input state or output bias of the system; and
   using the derived first, second and third sets of characteristics to control the catalytic system.

2. The method according to claim 1, wherein the first set of characteristics is associated with an internal state of a hydrolysis catalyst.

3. The method according to claim 2, wherein the first set of characteristics comprises a plurality of first parameters that each describes one of a plurality of internal parameters of the hydrolysis catalyst.

4. The method according to claim 3, wherein the first set of characteristics comprises at least one of: a level of isocyanic acid stored in the hydrolysis catalyst; a level of ammonia stored in the hydrolysis catalyst; a level of DEF stored in the hydrolysis catalyst; a level of solid urea stored in the hydrolysis catalyst; a level of water stored in the hydrolysis catalyst; or a profile/distribute-parameter vector of at least one of said levels.

5. The method according to claim 1, wherein the second set of characteristics is associated with an output of the hydrolysis catalyst.

6. The method according to claim 5, wherein the second set of characteristics comprises at least one of: an amount of urea; an amount of water; an amount of isocyanic acid; an amount of ammonia; an output temperature; or a profile/distributed-parameter vector of at least one of said amounts or temperature.

7. The method according to claim 1, wherein the step of deriving comprises using a set of non-linear algorithms to derive the first, second and third set of characteristics.

8. The method according to claim 1, wherein the set of non-linear algorithms comprises one of: an unscented Kalman filter; an extended Kalman filter; a moving horizon estimator.

9. The method according to claim 1, wherein the at least one set of measurements comprises at least one of: a DEF dosage rate, an inlet temperature, an inlet mass flow rate, or an inlet concentration of at least one compound.

10. The method according to claim 1, wherein the at least one set of measurements comprises at least one of: an outlet temperature; or an outlet concentration of at least one compound.

11. The method according to claim 1, further comprises performing a decorrelation step on at least one of the at least one sets of measurement data.

12. A selective catalytic reduction system for treating exhaust gas in an exhaust passage, the system comprising:
   a hydrolysis catalyst;
   a DEF dosing unit configured to inject DEF onto the hydrolysis catalyst;
   a plurality of sensors configured to measure a plurality of parameters of the system; and
   a controller configured to:
      receive at least one set of measurement data from the plurality of sensors;
      using non-linear algorithms, derive a first, a second, and a third set of characteristics of the system based on the at least one set of measurement data, the first set of characteristics being a plurality of internal parameters of the hydrolysis catalyst including a level of a compound in the hydrolysis catalyst, the second set of characteristics associated with an output of the system, and the third set of characteristics associated with an input state or output bias of the system; and
      control the injection of DEF onto the hydrolysis catalyst through the DEF dosing unit based on the derived first, second, and third sets of characteristics.

13. The system of claim 12, wherein the set of non-linear algorithms comprises one of: an unscented Kalman filter; an extended Kalman filter; a moving horizon estimator.

14. The system of claim 12, wherein the at least one set of measurements comprises at least one of: a DEF dosage rate, an inlet temperature, an inlet mass flow rate, or an inlet concentration of at least one compound.

15. The system of claim 12, wherein the first set of characteristics comprises at least one of: a level of isocyanic acid stored in the hydrolysis catalyst; a level of ammonia stored in the hydrolysis catalyst; a level of DEF stored in the hydrolysis catalyst; a level of solid urea stored in the hydrolysis catalyst; a level of water stored in the hydrolysis catalyst; or a profile/distribute-parameter vector of at least one of said levels.

16. The system of claim 12, wherein the second set of characteristics is associated with an output of the hydrolysis catalyst.

17. The system of claim 12, wherein the second set of characteristics comprises at least one of: an amount of urea; an amount of water; an amount of isocyanic acid; an amount of ammonia; an output temperature; or a profile/distributed-parameter vector of at least one of said amounts or temperature.

18. The system of claim 12, wherein the controller is further configured to perform a decorrelation step on at least one of the at least one sets of measurement data.

* * * * *